Patented May 20, 1930

1,759,010

UNITED STATES PATENT OFFICE

RONALD SMITH HORSFALL, LESLIE GORDON LAWRIE, AND JAMES ALEXANDER RUSSELL HENDERSON, OF MANCHESTER, ENGLAND, ASSIGNORS TO BRITISH DYESTUFFS CORPORATION LIMITED, OF MANCHESTER, ENGLAND

PROCESS OF DYEING ACETATE SILK

No Drawing. Application filed May 19, 1926, Serial No. 110,264, and in Great Britain May 29, 1925.

This invention relates to the dyeing of masses or fibres (artificial silk) composed of cellulose acetate. It is known that such material is not as a rule dyed by the ordinary acid and direct dyestuffs of commerce, which dyestuffs are usually salts of sulphonic acids. It has been concluded from this that the common solubilizing sulphonic acid group is to be avoided in dyestuffs intended for cellulose acetate fibres, and on this account many processes have been patented for the use of dyestuffs containing other solubilizing groups, e. g., the carboxylic acid group, (U. S. Letters Patent 1,498,315 and British Letters Patent 207,711); a temporarily solubilizing group, as for example, the group —NH.CH$_2$.SO$_3$H, which is dissociated by hydrolysis in the dye-bath, (U. S. Letters Patent 1,483,797) and even for the use of insoluble dyestuffs in a highly dispersed state, (British Letters Patent No. 219,349 and U. S. Letters Patent 1,534,019).

We have now found that the objects aimed at, more or less, in the above mentioned patents can be advantageously achieved by the use of dyestuffs of the ordinary acid type in which the sulphonic acid groups have been converted into sulphonamide groups. As a result of this change, dyestuffs with a good affinity for cellulose acetate fibres are obtained, and, in addition, the dyes generally possess a sufficient degree of solubility in water to make their employment possible in dyebaths of ordinary composition, i. e., they are not dependent on special methods such as the use of highly active dispersing agents. As an illustration of this invention may be mentioned the dyestuff obtained from Carmoisine WS (B. D. C.), i. e.

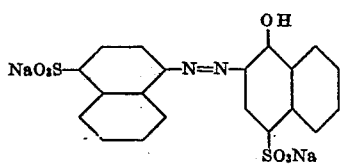

which in itself has no affinity for cellulose acetate fibres. By converting it into the corresponding sulphonamide believed to have the constitution:—

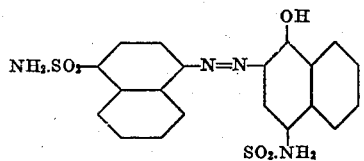

A dyestuff is obtained which dyes acetate cellulose silk from an aqueous solution, with or without the addition of assistants such as salt, sodium sulphate, acetic acid, etc., in red shades of excellent fastness.

The sulphonamide dyes may be obtained in any of the ways known to chemical science; thus an ordinary acid dye may in some cases have its sulphonic acid groups converted to sulphonamide groups by treatment first with phosphorus pentachloride and then with ammonia, or a dyestuff may be synthesized from components which already contain the requisite sulphonamide groups.

The following are examples of our invention, to the exact particulars of which we in no-wise limit ourselves.

Example 1

Acetyl cellulose is dyed a red-orange shade by means of the dyestuff having the probable constitution:—

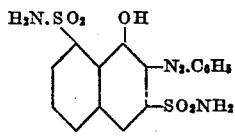

which is prepared by combining diazobenzene with 1-naphthol-3:8-disulphonamide, in the following manner:—One molecular proportion of aniline is diazotized in the usual manner and combined in alkaline solution with one molecular proportion of 1-naphthol-3:8-disulphonamide. To dye 100 parts by weight of acetyl cellulose, there is taken 1 part of the above dyestuff and 1 to 2 parts formic acid in a dye bath of about 3000 parts of water (all by weight) which is maintained at a temperature of 75° C. The acetyl cellulose silk is entered into the bath and worked at this temperature for half an hour, rinsed and dried. A red orange shade results.

*Example 2*

Orange shades are obtained by means of the dyestuff having the probable constitution:—

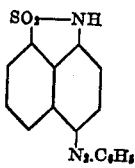

prepared by coupling diazobenzene with 1 : 8-naphtha-sultam. The method of dyeing is as given in Example 1.

We claim:—

1. The process of dyeing cellulose acetate fibers which comprises dyeing the fibers with azo dyestuffs containing a sulphonamide group other than those contained in the diazo component of such azo dyestuffs.

2. Cellulose acetate fiber dyed with dyes of the type of ordinary acid dyestuffs but having a sulphonamide group in lieu of a sulphonic acid group.

3. Cellulose acetate fibers dyed with an azo dyestuff containing a sulphonamide group other than those contained in the diazo component of such azo dyestuffs.

4. The process of dyeing cellulose acetate fibers which comprises dyeing the cellulose acetate fibers with a dyestuff corresponding to the formula,

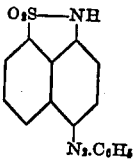

5. Cellulose acetate dyed with a dyestuff corresponding to the formula

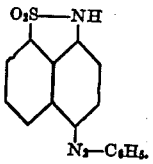

In testimony whereof we have hereunto affixed our signatures.

RONALD SMITH HORSFALL.
LESLIE GORDON LAWRIE.
JAMES ALEXANDER RUSSELL HENDERSON.